United States Patent
Knaresboro et al.

(10) Patent No.: US 6,408,760 B1
(45) Date of Patent: Jun. 25, 2002

(54) METHOD OF MANUFACTURING SOLID ROCKET MOTORS

(75) Inventors: Donald Lee Knaresboro; Forrest Ray Goodson, both of San Jose, CA (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 08/993,811

(22) Filed: Dec. 18, 1997

(51) Int. Cl.$^7$ ............................................... C06B 45/00
(52) U.S. Cl. ........................ 102/288; 264/3.1; 102/289
(58) Field of Search ................. 264/3.1; 149/109.6; 102/288, 289, 290

(56) References Cited

U.S. PATENT DOCUMENTS

| | | | |
|---|---|---|---|
| 3,090,196 A | * 5/1963 | Brewer | 102/289 X |
| 3,107,620 A | * 10/1963 | O'Donnell | 102/289 |
| 3,492,815 A | * 2/1970 | McCullough | 102/289 |
| 3,756,025 A | * 9/1973 | McCullough | 102/289 X |
| 3,793,097 A | * 2/1974 | Lawrence | 102/289 X |
| 4,764,319 A | * 8/1988 | Hightower, Jr. et al. | 102/289 X |
| 4,783,232 A | * 11/1988 | Carbone et al. | 156/172 |
| 4,785,040 A | | 11/1988 Gupta et al. | 524/445 |
| 5,127,223 A | * 7/1992 | Hightower, Jr. et al. | 60/251 |
| 5,230,841 A | * 7/1993 | Redecker et al. | 149/109.6 X |
| 5,397,399 A | * 3/1995 | Lownds | 149/109.6 |
| 5,432,207 A | | 7/1995 Rader | 521/128 |
| 5,433,899 A | * 7/1995 | Goetz | 149/109.6 X |
| 5,514,725 A | | 5/1996 Rader | 521/128 |
| 5,635,665 A | * 6/1997 | Kishi et al. | 102/288 |
| 5,693,684 A | * 12/1997 | Rader | 521/78 |

* cited by examiner

*Primary Examiner*—Charles T. Jordan
*Assistant Examiner*—Glenda L. Sánchez
(74) *Attorney, Agent, or Firm*—John Swiatocha

(57) ABSTRACT

The method for manufacturing solid rocket motors of the present invention comprises placing a mandrel having at least one easily disintegrative solid slot former positioned thereon substantially centrally along the axis of a rocket case, casting uncured solid rocket propellant about the mandrel and the easily disintegrative solid slot former, curing the solid propellant, and removing the mandrel and the easily disintegrative solid slot former from the cured propellant.

4 Claims, 2 Drawing Sheets

METHOD OF MANUFACTURING SOLID ROCKET MOTORS

TECHNICAL FIELD OF THE INVENTION

The present invention relates to solid propellant rocket motors and in particular to the preparation of solid rocket propellant having secondary slots.

BACKGROUND OF THE INVENTION

Solid propellant rocket motors typically comprise a rocket case, usually formed of metal or composite material, a thermal insulation layer lining the interior wall of the rocket case and a solid propellant. Positioned along the longitudinal axis and through the center of the solid propellant is a central bore leading to a nozzle in the aft section of the rocket motor. During ignition, the propellant burns and the combustion gases products pass through the central bore and nozzle, thereby propelling the rocket.

The grain configuration and the rate at which the solid propellant burns establishes the thrust characteristics of that rocket motor. Unlike liquid propellant rockets, solid propellant rockets are unable to control or alter their thrust characteristics after ignition by adjusting the amount of fuel entering the area of combustion. However, the configuration of the propellant and the precise rate of propellant combustion and therefore, thrust characteristics of the solid rocket motor may be tailored to meet specific requirements by precisely controlling the surface area of the propellant exposed to ignition. To achieve such control, the propellant is provided with various passages and/or slots configured to yield the desired thrust characteristics. In many solid propellant rocket motors the configuration includes the aforementioned central bore as well as secondary slots formed radially and coaxially about the bore.

The central bore is formed in the rocket motor by positioning a mandrel in an empty rocket case substantially along the central longitudinal axis thereof Uncured rocket propellant is then poured into the interior of the rocket case, filling the rocket case and surrounding the mandrel. After the rocket propellant is cured (solidified), the mandrel is removed from the rocket case leaving behind the central bore. However, several problems in fabricating the secondary slots have been encountered.

One approach which results in a very precise slot configuration is the machining of the slots into the propellant. This approach, however, is only convenient and cost effective when the rocket motor is large and the number of units being machined is small. When the solid rocket motor is small and there are many units to be manufactured, machining costs per unit can be prohibitively high. Additional problems associated with machining slots are that such operations produce undesirably, large quantities of propellant machining waste and the resulting slots must be radiographically inspected both before and after machining. Moreover, machining a solid propellant carries a danger of accidental ignition because of the heat associated with machining friction and accidental impact of machine tools with the case.

A further difficulty with machining the secondary slots in the solid propellant is that there is little if any longitudinal stress relief upon cool-down of the curing propellant. Shrinkage of the propellant as it cools at a rate different from that of any shrinkage of the case, causes relatively high stresses in the propellant along the longitudinal axis thereof. Such stresses which arise during cool down, often causes splitting or cracking of the propellant, thus rendering it unsuitable for the manufacturing operations.

An alternative approach to machining these secondary slots is to use polyurethane foam slot formers. Polyurethane foam can be cut inexpensively into small intricate pieces to use for small rocket motors. The polyurethane foam slot formers are attached to the mandrel and the solid propellant is molded or cast around the mandrel and the polyurethane slot formers. Although the removal of the mandrel from the solid propellant in this method creates the central bore, the polyurethane foam used to shape the slots, cannot be easily removed from the solid propellant because of the structural integrity of the polyurethane foam. Attempts to remove the polyurethane foam from the propellant results in less than ideal separation, since some foam can remain attached to the propellant on the slot surface.

As a result of the difficulty of removing the polyurethane, solid propellant rocket motors using polyurethane foam are usually fired with the polyurethane foam slot formers still in place in the secondary slots. This can produce a pressure spike at the beginning of the ignition sequence because the flame front will cover the entire surface area of the solid propellant very quickly, but the polyurethane foam will hinder the exhaust gas of the burning propellant from escaping to the central bore and then to the exhaust nozzle. The pressure spike is higher than that of an empty machined slot of identical size and configuration and, if excessive, can cause catastrophic failure of the rocket motor. Another disadvantage of using polyurethane foam is the additional requirement of freon as a blowing agent for the foam.

Still another approach to forming the secondary slots in the solid rocket propellant is to attach the mandrel to an inflatable rubber tube in the desired form of the secondary slot. Secondary slots are formed when the solid propellant is poured around the inflated rubber tube and the mandrel. When the propellant is cured, the rubber tube is deflated, allowing the mandrel and the deflated rubber tube to be removed along the central bore. However, because of the limited dimensional stability inherent in such rubber tubes, reproducing either intricate shapes or exact slot dimensions is often difficult. The inflatable rubber tube is also undesirable because of the risk of rupture to the rubber tube which generally results in scrappage of the solid rocket propellant used in the manufacturing process, because of the failure of the molding operation.

Therefore, what is needed in the art is an inexpensive and reliable method of making secondary slots in solid rocket propellants.

DISCLOSURE OF THE INVENTION

The method for manufacturing solid rocket motors of the present invention comprises placing a mandrel having at least one easily disintegrative solid slot former positioned thereon substantially centrally along the axis of a rocket case, casting uncured solid rocket propellant about the mandrel and the disintegrative solid slot former, curing the solid propellant, and removing the mandrel and the disintegrative solid slot former from the cured propellant.

BEST MODE FOR CARRYING OUT THE INVENTION

Figure 1:
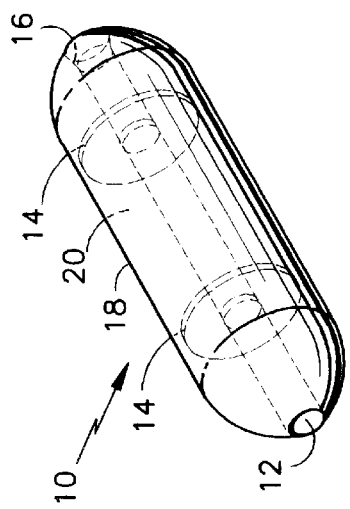
FIG. 1 is a perspective view of a rocket motor of the type in which the present invention is employed.
Figure 2:
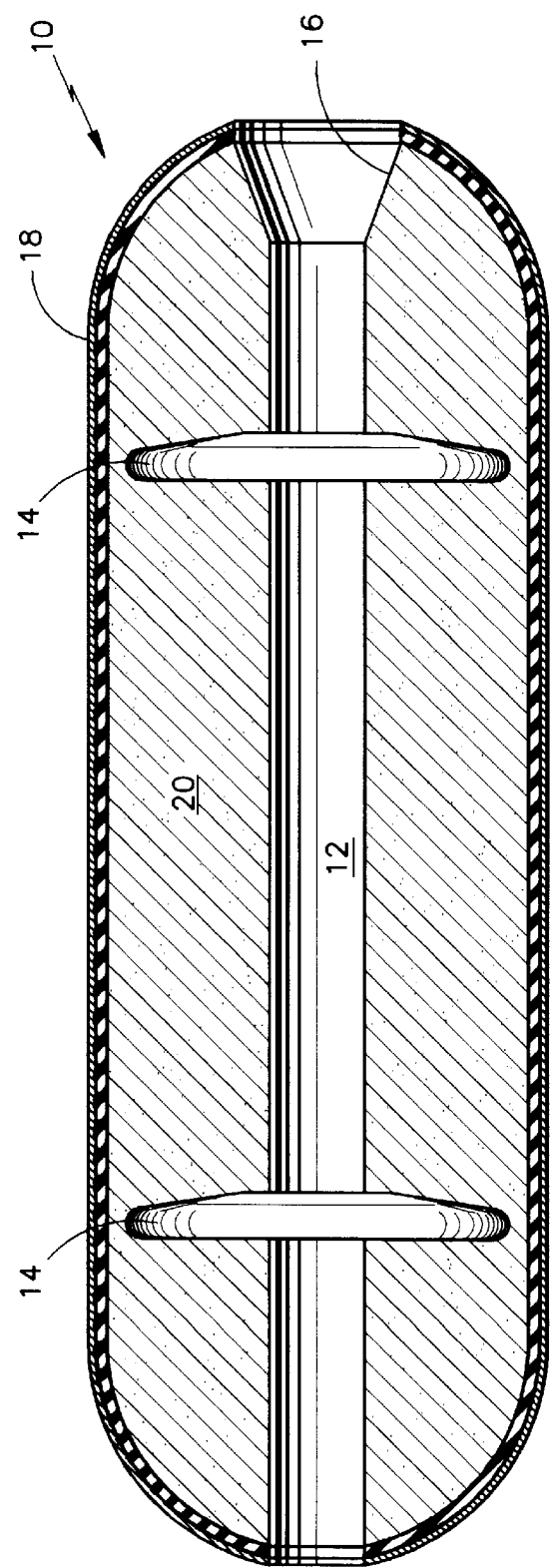
FIG. 2 is a cross-sectional view of the rocket motor shown in FIG. 1.

Referring to FIGS. 1 and 2, a rocket motor 10 includes an outer casing 18 and a solid rocket propellant 20 therewithin. Positioned along the longitudinal axis of the rocket motor 10 is a central bore 12 to the exhaust nozzle 16 for the bore of exhaust gases which are developed during ignition and burning of the propellant 20. Radiating about the bore 12 are one or more radially extending (annular), secondary slots 14 which are formed coaxially with and about the conduit 12. As set forth hereinabove, the shape of these secondary slots and thus the surface thereof 14 controls the propellant burnback characteristics and thus in large measure, the thrust characteristics of the rocket motor.

Figure 3:
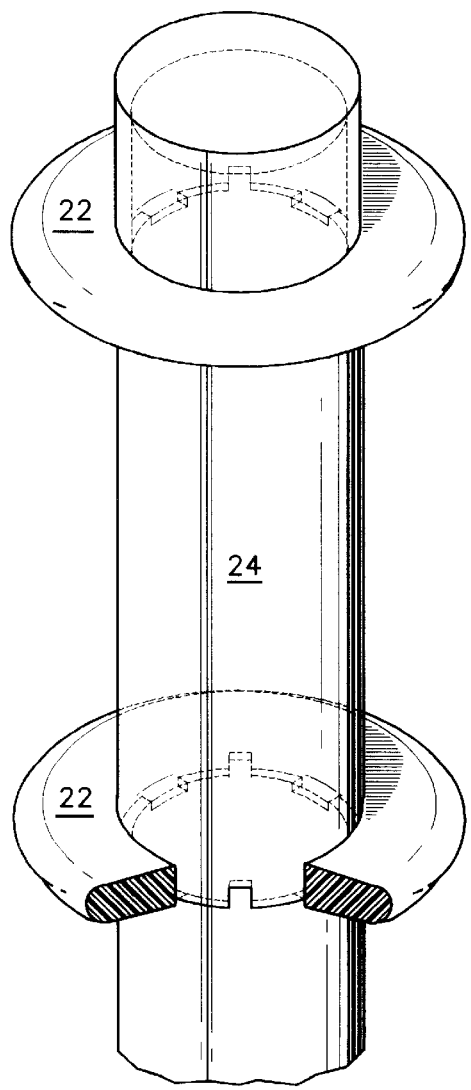
FIG. 3 is a perspective view, partially sectioned, of a mandrel and disintegrative solid slot formers employed in the method of the present invention.

Referring to FIG. 3, a mandrel 24 and a plurality of axially spaced, disintegrative solid slot formers 22 disposed therearound, define the bore 12 and the secondary slots 14, respectively. The mandrel 24 is essentially a cylinder and is manufactured from standard materials such as various metals and ceramics readily known in the art. The disintegrative solid slot formers 22 are attached to the mandrel 24 along the circumference of the mandrel 24 and are formed from an easily disintegrative solid such as a phenolic foam (although equivalent solids may be enlarged) that has a density preferably between 3–12 lb/ft$^3$, more preferably between 4–9 lb/ft$^3$, and most preferably between 5–6 lb/ft$^3$. The easily disintegrative solid may be molded into the precise shape of the slot formers or molded into an approximation of the desired shape and subsequently machined into the final form.

Figure 4:
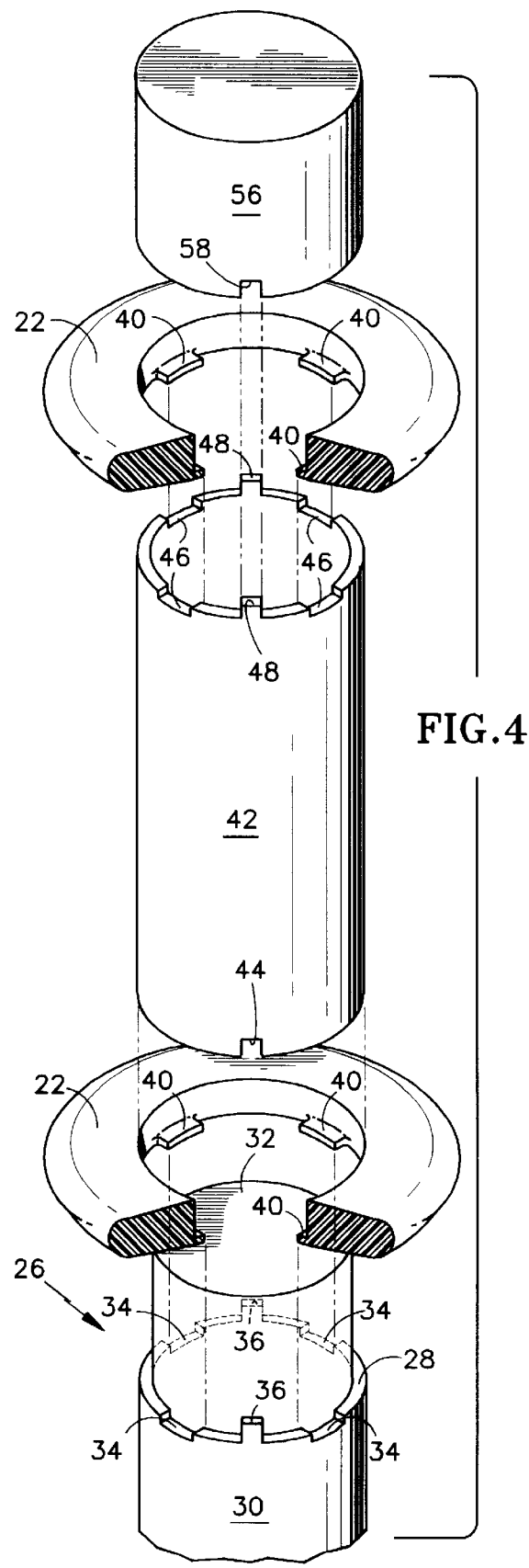
FIG. 4 is an exploded view of a mandrel and disintegrative solid slot formers shown in FIG. 3.

Referring to FIG. 4, a mandrel base 26 comprises a pedestal 30 terminating at shoulder 28 to a reduced diameter cylindrical core 32. Formed into the pedestal 30 at the shoulder 28 are a plurality of slots 34. A pair of upstanding teeth 36 are also formed into the shoulder.

A toroidal-shaped easily disintegrative solid slot former 22 is attached to the base of the mandrel 26 by slipping the slot former 22 over the core 32 until the slot former 22 engages the shoulder 28 on the mandrel base 26, a plurality of tabs 40, extending inwardly from the inner surface of the slot former, engaging corresponding slots 34 in shoulder 28.

The mandrel base 26 is prepared for another slot former 22 by running a first hollow cylinder 42 over the core 32 until the hollow cylinder 42 engages the pedestal 30. First hollow cylinder 42 is held into engagement with the mandrel base 26 by means of a plurality of slots 44 in the lower end thereof which engage upstanding teeth 36 in the pedestal.

Formed in the upper end of first hollow cylinder 42 are a plurality of slots 46 and upstanding teeth 48. Slots 46 and teeth 48 formed in first hollow cylinder 42 are of substantially the same dimensions and serve the same purpose as slots 34 and teeth 36 formed in pedestal 30.

Second (upper) slot former 22 is added to the mandrel base 26 by slipping the second slot former over core 32 to the upper end of first hollow cylinder 42. The second slot former 22 engages mandrel 26 by the registration of tabs 40 with slots 46 in the upper end of hollow cylinder 42 in the manner described hereinabove with respect to the engagement of the first slot former with pedestal 30.

When the desired number of slot formers 22 are attached to the mandrel 26, a cap 56 is affixed to the mandrel at the upper end of core 32. The cap 56 is slipped over core 32 until it engages the upper end of cylinder 42 where slots 58 in the bottom of the cap engage mating upstanding teeth 48 in the end of cylinder 42.

The attachment of the disintegrative solid slot formers 22 to the mandrel 24 described herein is meant to be illustrative only and various other means for attachment can be employed. Likewise, while two disintegrative solid slot formers 22 are employed to define the secondary slots 14, the actual number of disintegrative solid slot formers 22 used will be function of the desired surface area and burnback characteristics for the rocket motor.

The method of forming the secondary slots 14 is best performed as follows. The assembly of the mandrel 24 and the disintegrative solid slot formers 22 is positioned substantially centrally along the longitudinal axis of the empty outer casing 18 of the rocket motor 10. Air is then removed from the rocket motor 10 to create a vacuum. Solid rocket propellant 20 is then introduced in its uncured state into the rocket motor 10 using any of various known techniques (spreader cones) to avoid liquid fold lines underneath the secondary slots 12. The flow of the solid rocket propellant 20 is slowed as the solid rocket propellant 20 meets the underside, of the first disintegrative solid slot former 22 and then is stopped when the solid rocket propellant 20 meets the midline of that disintegrative solid slot former.

As best shown in FIG. 3, the disintegrative solid slot formers 22 may include chamfered undersides for mitigating the risk of the entrapment of air under the slot former from developing when the uncured rocket propellant is introduced into the rocket case. Trapped air can create a larger than desired surface area for the secondary slot 14. Longitudinal grooves can also be etched into the surface of the mandrel adjacent to the disintegrative solid slot formers 22 to help avert the formation of voids, the grooves allow any trapped air to vent along the mandrel when propellant flow is suspended.

When the flow of the solid rocket propellant 20 is resumed, propellant continues to fill the casing until the propellant encounters the next successive slot former, whereupon flow is temporarily suspended to allow the venting of air as described hereinabove, and is then resumed. When all disintegrative solid slot formers 22 and the mandrel 24 are covered with the solid rocket propellant 20, in this manner, the uncured solid rocket propellant 20 is caused to cure in situ, usually by heating.

After the solid propellant 20 is cured, the mandrel 24 is removed from the solid propellant rocket motor 10 leaving the central bore 12. After the mandrel 24 is removed, the disintegrative solid slot formers 22 are mechanically removed from the solid propellant 20 by a light hand scraping or equivalent mechanical process, forming secondary slots 14 coaxially about the central bore 12.

Once the mandrel 24 and the disintegrative solid slot formers 22 are removed, the spatial dimensions of the central bore 12 and the secondary slot 14 are radiographically inspected to assure that the central bore 12 and the secondary slots 14 conform to the desired predetermined configuration.

What is claimed is:

1. A method for forming solid rocket propellant motors, comprising:
   providing a mandrel having an easily disintegrative solid slot former positioned thereon;
   casting uncured solid rocket propellant about said mandrel and said easily disintegrative solid slot former;
   curing said solid rocket propellant;
   removing said mandrel from said solid rocket propellant; and mechanically removing said easily disintegrative solid slot former from said solid rocket propellant by scraping or other equivalent mechanical process.

2. The method of claim 1 wherein said easily disintegrative solid former is removed by mechanically scraping said easily disintegrative solid slot former from said cured propellant.

3. The method of claim 1 wherein said easily disintegrative solid slot former comprises a phenolic foam.

4. The method of claim 3 wherein said phenolic foam has a density of 3–12 lbs/ft$^3$.

* * * * *